(12) United States Patent
Mori et al.

(10) Patent No.: US 12,322,206 B2
(45) Date of Patent: Jun. 3, 2025

(54) PRESENTATION CONTROL DEVICE, SYSTEM, METHOD AND NON-TRANSITORY COMPUTER-READABLE MEDIUM STORING PROGRAM THEREIN

(71) Applicant: NEC Corporation, Tokyo (JP)

(72) Inventors: Yusuke Mori, Tokyo (JP); Takeshi Yamaguchi, Tokyo (JP); Honami Yuki, Tokyo (JP); Shuuji Kikuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 387 days.

(21) Appl. No.: 17/799,996

(22) PCT Filed: Mar. 2, 2020

(86) PCT No.: PCT/JP2020/008750
§ 371 (c)(1),
(2) Date: Aug. 16, 2022

(87) PCT Pub. No.: WO2021/176535
PCT Pub. Date: Sep. 10, 2021

(65) Prior Publication Data
US 2023/0072746 A1 Mar. 9, 2023

(51) Int. Cl.
*G06V 40/16* (2022.01)
*G01C 21/26* (2006.01)
*G06F 21/32* (2013.01)

(52) U.S. Cl.
CPC ......... *G06V 40/168* (2022.01); *G01C 21/265* (2013.01); *G06F 21/32* (2013.01)

(58) Field of Classification Search
CPC .. G06V 40/168; G06V 40/172; G06V 40/179; G01C 21/265; G01C 21/20;
(Continued)

(56) References Cited

U.S. PATENT DOCUMENTS

2011/0238476 A1   9/2011 Carr et al.
2012/0265433 A1*  10/2012 Viola ............... G01C 21/362
                                              701/410
(Continued)

FOREIGN PATENT DOCUMENTS

JP    2010-055594 A    3/2010
JP    2015-149080 A    8/2015
(Continued)

OTHER PUBLICATIONS

International Search Report for PCT Application No. PCT/JP2020/008750, mailed on Jun. 2, 2020.
(Continued)

*Primary Examiner* — Brandon J Miller

(57) ABSTRACT

A presentation control device is provided for guiding a visitor in a specific area to an appropriate point in the area. The presentation control device (100) includes an acquisition unit (130) that acquires a photographed image photographed by a predetermined photographing device, an authentication control unit (140) that extracts a face area or facial feature information from the photographed image and causes an authentication device (200) to perform face authentication, a specification unit (160) that specifies presentation information to be presented for guiding to a predetermined point, based on a movement history and an action history being associated with a user ID of a user who succeeds in the face authentication, and an output unit (170) that transmits the presentation information specified by the specifying unit (160) to a predetermined display terminal.

10 Claims, 19 Drawing Sheets

(58) Field of Classification Search
CPC . G01C 21/3484; G01C 21/3667; G06F 21/32; G16Y 10/40
See application file for complete search history.

(56) References Cited

U.S. PATENT DOCUMENTS

2015/0065173 A1* 3/2015 Pliner ............... H04W 4/029
                                                      455/456.3
2020/0084623 A1* 3/2020 Mohammed ......... H04W 12/06

FOREIGN PATENT DOCUMENTS

| JP | 5982056 B | 8/2016 |
| JP | 2016-170490 A | 9/2016 |
| JP | 2019-040420 A | 3/2019 |
| WO | 2006/101169 A1 | 9/2006 |

OTHER PUBLICATIONS

JP Office Action for JP Application No. 2022-504792, mailed on Aug. 22, 2023 with English Translation.

* cited by examiner

PRESENTATION CONTROL DEVICE, SYSTEM, METHOD AND NON-TRANSITORY COMPUTER-READABLE MEDIUM STORING PROGRAM THEREIN

This application is a National Stage Entry of PCT/JP2020/008750 filed on Mar. 2, 2020, the contents of all of which are incorporated herein by reference, in their entirety.

TECHNICAL FIELD

The present invention relates to a presentation control device, a system, a method and a non-transitory computer-readable medium storing a program, and more particularly, relates to a presentation control device, a system, a method and a non-transitory computer-readable medium storing a program for presenting presentation information to a user.

BACKGROUND ART

Patent Literature 1 discloses a technique of acquiring an action history of a store visitor for each store visitor, estimating gender, age, and the like of the store visitor, and acquiring an action history particular to a specific gender or age group. In addition, Patent Literature 2 discloses a technique of inferring an action, based on a position of a mobile terminal.

CITATION LIST

Patent Literature

[Patent Literature 1] Japanese Unexamined Patent Application Publication No. 2010-055594
[Patent Literature 2] Japanese Unexamined Patent Application Publication No. 2015-149080

SUMMARY OF INVENTION

Technical Problem

Herein, in a specific area (e.g., Shibuya) where many visitors visit, there is a problem that visitors concentrate on some places (e.g., a scramble intersection) and are difficult to visit to a surrounding area (e.g., a shopping district).

The present disclosure has been made in order to solve such a problem, and an object thereof is to provide a presentation control device, a system, a method, and a non-transitory computer-readable medium storing a program for guiding a visitor in a specific area to an appropriate point in the area.

Solution to Problem

A presentation control device according to the present disclosure includes: an acquisition unit configured to acquire a photographed image photographed by a predetermined photographing device; an authentication control unit configured to extract a face area or facial feature information from the photographed image and cause an authentication device to perform face authentication; a specification unit configured to specify presentation information to be presented for guiding to a predetermined point, based on a movement history and an action history being associated with a user ID of a user who succeeds in the face authentication; and an output unit configured to transmit the presentation information specified by the specification unit to a predetermined display terminal.

A presentation control system according to the present disclosure includes: a predetermined photographing device configured to photograph an image including a face area of a user; a presentation control device configured to be communicable with the predetermined photographing device; and an authentication device configured to store facial feature information of the user and be communicable with the presentation control device, wherein the presentation control device includes an acquisition unit configured to acquire a photographed image photographed by the predetermined photographing device, an authentication control unit configured to extract a face area or facial feature information from the photographed image and cause the authentication device to perform face authentication, a specification unit configured to specify presentation information to be presented for guiding to a predetermined point, based on a movement history and an action history being associated with a user ID of a user who succeeds in the face authentication, and an output unit configured to transmit the presentation information specified by the specification unit to a predetermined display terminal.

A presentation control method according to the present disclosure includes, by a computer: a step of acquiring a photographed image photographed by a predetermined photographing device; a step of extracting a face area or facial feature information from the photographed image and causing an authentication device to perform face authentication; a step of specifying presentation information to be presented for guiding to a predetermined point, based on a movement history and an action history of a user who succeeds in the face authentication; and a step of transmitting the specified presentation information to a predetermined display device.

A non-transitory computer-readable medium according to the present disclosure records a program causing to execute: a step of acquiring a photographed image photographed by a predetermined photographing device; a step of extracting a face area or facial feature information from the photographed image and causing an authentication device to perform face authentication; a step of specifying presentation information to be presented for guiding to a predetermined point, based on a movement history and an action history of a user who succeeds in the face authentication; and a step of transmitting the specified presentation information to a predetermined display device.

A presentation control device according to the present disclosure includes: an acquisition unit configured to acquire a photographed image photographed by a predetermined photographing device; an extraction unit configured to extract a face area or facial feature information from the photographed image; a face authentication unit configured to perform face authentication, based on the face area or the facial feature information; a specification unit configured to specify presentation information to be presented for guiding to a predetermined point, based on a movement history and an action history being associated with a user ID of a user who succeeds in the face authentication; and an output unit configured to transmit the presentation information specified by the specification unit to a predetermined display terminal.

A presentation control method according to the present disclosure includes, by a computer: a step of acquiring a photographed image photographed by a predetermined photographing device; a step of extracting a face area or facial feature information from the photographed image; a step of performing face authentication, based on the face area or the facial feature information; a step of specifying presentation information to be presented for guiding to a predetermined point, based on a movement history and an action history of a user who succeeds in the face authentication; and a step of transmitting the specified presentation information to a predetermined display device.

A non-transitory computer-readable medium according to the present disclosure records a program causing to execute: a step of acquiring a photographed image photographed by a predetermined photographing device; a step of extracting a face area or facial feature information from the photographed image; a step of performing face authentication, based on the face area or the facial feature information; a step of specifying presentation information to be presented for guiding to a predetermined point, based on a movement history and an action history of a user who succeeds in the face authentication; and a step of transmitting the specified presentation information to a predetermined display device.

Advantageous Effects of Invention

The present disclosure is able to provide a presentation control device, a system, a method, and a non-transitory computer-readable medium storing a program for guiding a visitor in a specific area to an appropriate point in the area.

EXAMPLE EMBODIMENT

Hereinafter, example embodiments of the present disclosure will be described in detail with reference to the drawings. In each drawing, the same or corresponding elements are denoted by the same reference signs, and duplicate descriptions are omitted as necessary for clarity of description.

First Example Embodiment

Figure 1:
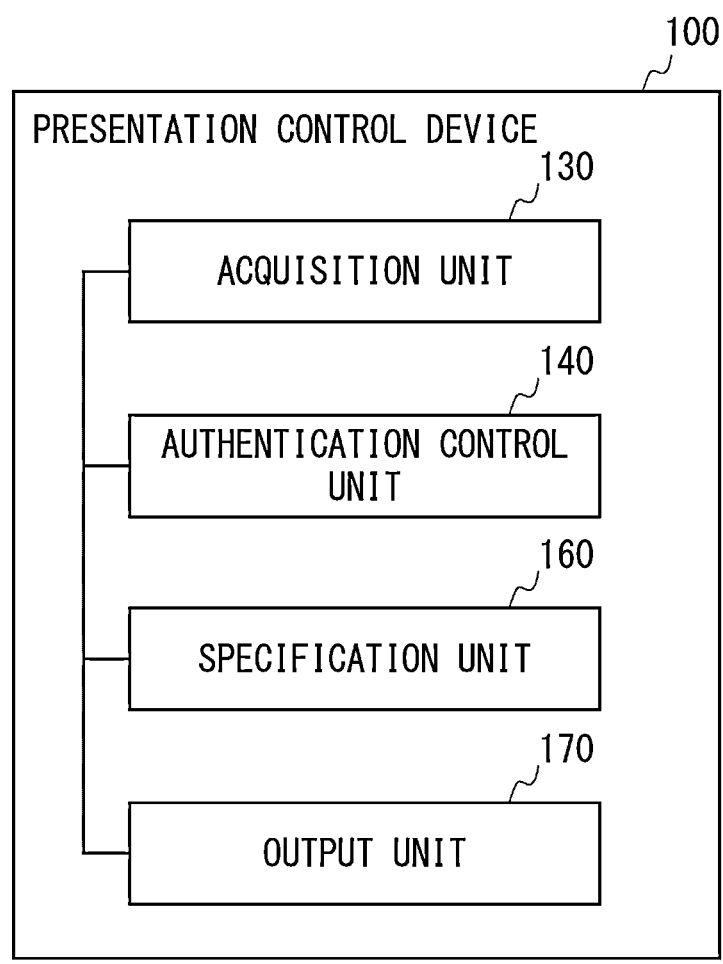
FIG. 1 is a block diagram illustrating a configuration of a presentation control device according to a first example embodiment.

FIG. 1 is a block diagram illustrating a configuration of a presentation control device 100 according to a first example embodiment. The presentation control device 100 includes an acquisition unit 130, an authentication control unit 140, a specification unit 160, and an output unit 170. The presentation control device 100 is connected to a network 500 (not illustrated). The network 500 may be wired or wireless. An authentication device 200 and a face authentication terminal 300 (not illustrated) are connected to the network 500.

The acquisition unit 130 acquires a photographed image photographed by a predetermined photographing device. The photographed image is an image photographed with a user. The predetermined photographing device is, for example, a camera included in the face authentication terminal 300 and a camera of a user terminal such as a smart phone carried by a user. The authentication control unit 140 extracts a face area or facial feature information from the photographed image, and causes the authentication device 200 to perform face authentication. The authentication device 200 stores a user ID and facial feature information of the user in association with each other in advance.

The specification unit 160 specifies presentation information to be presented for guiding to a predetermined point, based on a movement history and an action history associated with a user ID of a user who succeeds in face authentication or a user ID included in a presentation request. The output unit 170 transmits the presentation information specified by the specification unit 160 to a predetermined display terminal. The predetermined display terminal is, for example, the face authentication terminal 300, a user terminal, a shop terminal, and a street signage. The user terminal is a communication terminal such as a smart phone carried by a user. The shop terminal is a terminal installed in each shop, and displays, for example, "next, would you like to go to ○ ○?" when a user exits a shop.

Figure 2:
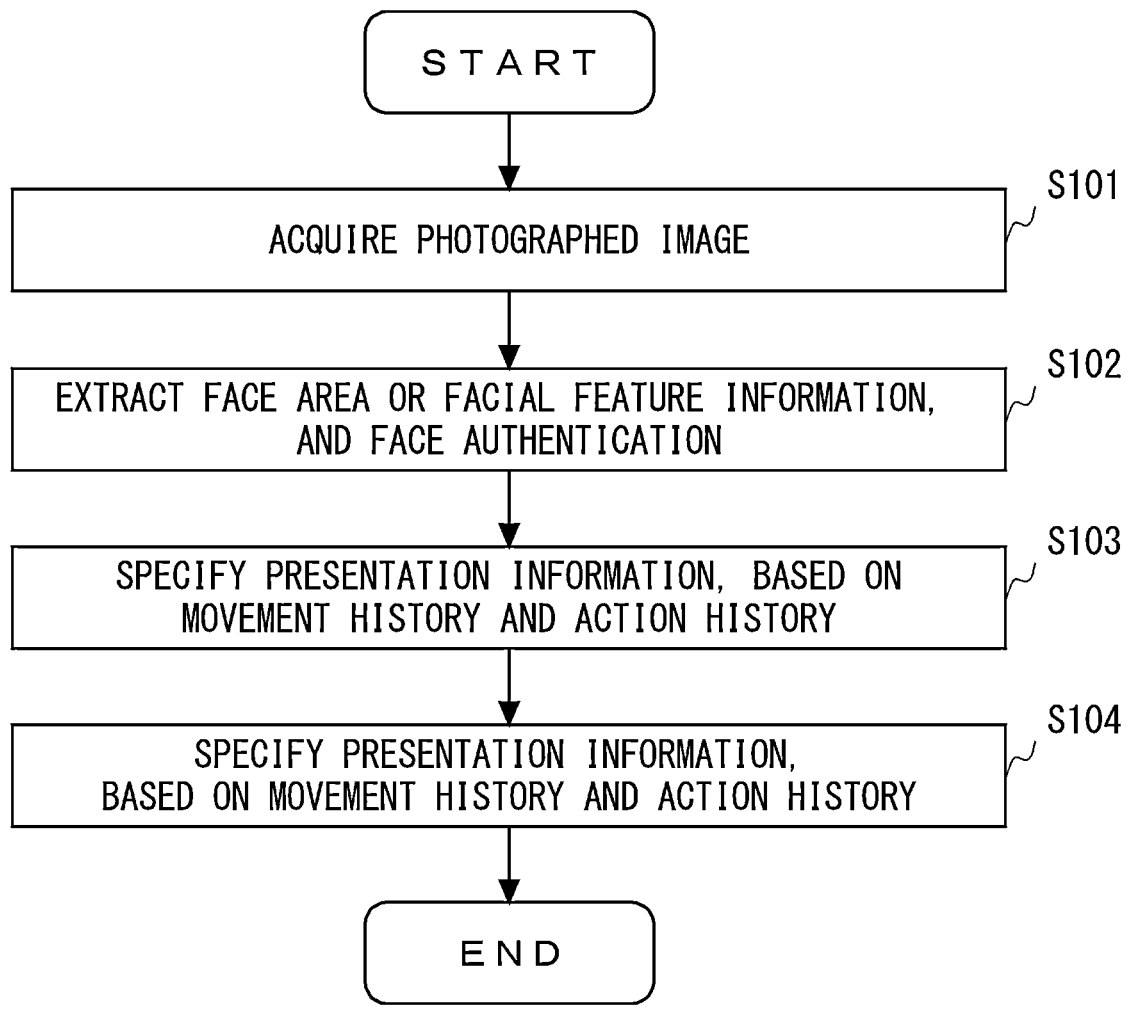
FIG. 2 is a flowchart illustrating a flow of a presentation control method according to the first example embodiment.

FIG. 2 is a flowchart illustrating a flow of a presentation control method according to the first example embodiment. First, the acquisition unit 130 acquires a photographed image photographed by a predetermined photographing device (step S101). Next, the authentication control unit 140 extracts a face area or facial feature information from the photographed image acquired by the acquisition unit 130, and causes the authentication device 200 to perform face authentication (step S102). The authentication device 200 collates the face area or the facial feature information received from the authentication control unit 140 with facial feature information registered in the authentication device 200, determines whether the authentication is successful based on presence or absence of match, and replies a determination result. Note that, it is assumed that the authentication device 200 stores a user ID and facial feature information in association with each other. Then, when the face authentication is successful, the authentication device 200 replies the successful user ID by including in the determination result.

Next, the specification unit 160 specifies presentation information to be presented for guiding a user to a predetermined point, based on a movement history and an action history associated with a user ID which succeeds in face authentication or a user ID included in the presentation request (step S103). Next, the output unit 170 transmits the presentation information specified by the specification unit 160 to a predetermined display terminal (step S104). As described above, the presentation control method according to the present example embodiment can present, to a user, presentation information for guiding a visitor in a specific area to an appropriate point in the area.

In addition to the configuration illustrated in FIG. 1, the presentation control device 100 may include each configuration such as a history storage unit, a history registration unit, and a presentation information storage unit.

The history storage unit stores a movement history and an action history of a user. The movement history is a history of passing points through which a user has passed, and may include information on a time of passing. The passing point is an installation position of the face authentication terminal 300 at which a user succeeds face authentication, and is, for example, identification information of each face authentication terminal 300. The action history is a history of action contents performed by a user when the face authentication is successful, and is, for example, a purchase history of a product or the like, an entry/exit record of a facility, a participation record of an event, or the like. The action history may include information on a time at which a user acted.

The history registration unit registers, in the history storage unit, the user ID, the movement history, and the action history in association with one another. Prior to step S101 illustrated in FIG. 2, the history registration unit registers, in the history storage unit, the user ID, the movement history, and the action history in association with one another.

The presentation information storage unit stores presentation information to be presented to a user for guiding to a point different from a current point, and a presentation condition based on the movement history and the action history of the user, in association with each other. The presentation condition is a combination of a current position of a user and a pair of the passage point and the action history. The current position of a user is a position of the face authentication terminal 300 at which the user succeeds in face authentication. The presentation information is information for presenting to a user who succeeds in face authentication when the user satisfies the presentation condition. The presentation information is guidance information for guiding a user to a predetermined point being a guidance destination. In other words, the presentation information includes a point of the guidance destination and the guidance information.

The specification unit 160 acquires, from the history storage unit, the movement history and the action history associated with the user ID of a user who succeeds in face authentication or the user ID included in the presentation request. The specification unit 160 specifies presentation information in which the movement history and the action history satisfy the presentation condition stored in a presentation information storage unit 150.

Note that, the presentation control device 100 includes a processor, a memory, and a storage device as a not-illustrated configuration. In addition, the storage device stores a computer program in which processing of the presentation control method according to the present example embodiment is implemented. Then, the processor reads a computer program from the storage device into the memory, and executes the computer program. As a result, the processor achieves functions of the history registration unit, the acquisition unit 130, the authentication control unit 140, the specification unit 160, and the output unit 170.

Alternatively, each of the history registration unit, the acquisition unit 130, the authentication control unit 140, the specification unit 160, and the output unit 170 may be achieved by dedicated hardware. In addition, a part or all of each component of each device may be achieved by general-purpose or dedicated circuitry, a processor, or the like, or a combination thereof. These may be configured by a single chip, or may be configured by a plurality of chips connected via a bus. A part or all of each component of each device may be achieved by a combination of the above-described circuitry or the like and a program. In addition, as the processor, a central processing unit (CPU), a graphics processing unit (GPU), a field-programmable gate array (FPGA), or the like can be used.

In addition, when a part or all of each component of the presentation control device 100 are achieved by a plurality of information processing devices, pieces of circuitry, and the like, the plurality of information processing devices, pieces of circuitry, and the like may be centrally arranged or distributed. For example, the information processing device, the circuitry, and the like may be achieved as a form, such as a client-server system and a cloud computing system, each of which is connected via a communication network with each other. In addition, the function of the presentation control device 100 may be provided in a software as a service (SaaS) form.

Second Example Embodiment

Figure 3:
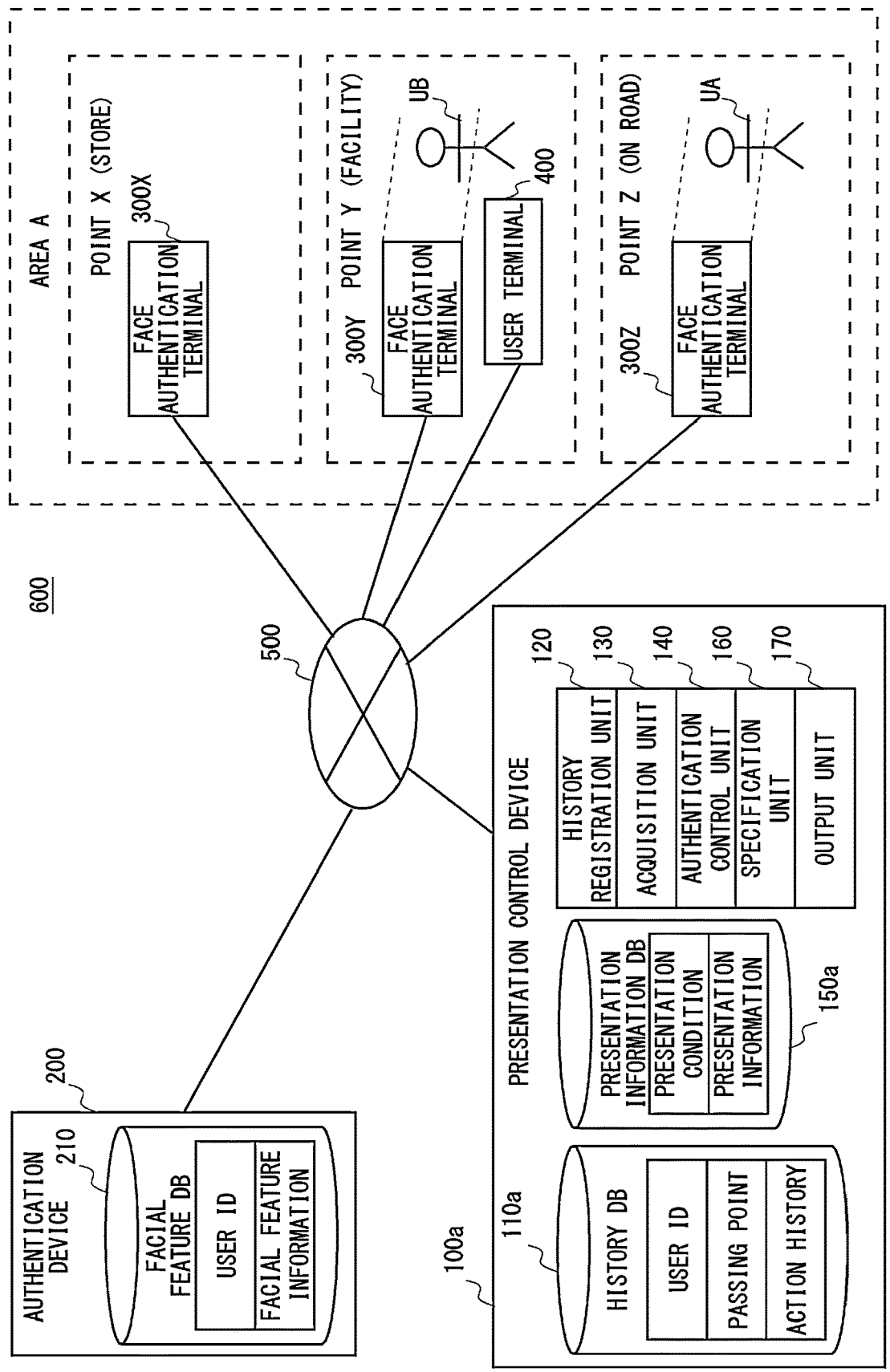
FIG. 3 is a block diagram illustrating a configuration of a presentation control system according to a second example embodiment.

A second example embodiment is a specific example of the first example embodiment described above. FIG. 3 is a block diagram illustrating a configuration of a presentation control system 600 according to the second example embodiment. The presentation control system 600 includes at least a presentation control device 100*a* and an authentication device 200, and further includes at least one of a face authentication terminal 300 and a user terminal 400. The presentation control device 100*a*, the authentication device 200, the face authentication terminal 300, and the user terminal 400 are connected with one another via a network 500. Note that, the description overlapping with the first example embodiment is omitted as appropriate.

The presentation control device 100*a* includes a history database (DB) 110*a*, a history registration unit 120, an acquisition unit 130, an authentication control unit 140, a presentation information DB 150*a*, a specification unit 160, and an output unit 170. The presentation control device 100*a* is an information processing device that performs accumulation of an action history, specification and presentation of presentation information from a photographed image, and is a server device achieved by a computer, for example.

The history DB 110*a* is a database for accumulating a passage point and an action history of a user. The history DB 110*a* stores a user ID, and the passing point and the action history of the user in association with each other. The history registration unit 120 receives a history registration request from the face authentication terminal 300 or the user terminal 400 via the network 500, and registers, in the history DB 110a, the user ID included in the history registration request, and the passing point and the action history in association with each other.

The acquisition unit 130 receives a face authentication request, a history registration request, and a presentation request from the face authentication terminal 300 or the user terminal 400 via the network 500. In other words, the acquisition unit 130 acquires an image photographed by a camera 310 or 410, installation position information of the camera 310 or 410, and the like from the face authentication terminal 300 or the user terminal 400.

The authentication control unit 140 extracts a face area or facial feature information from an authentication image included in the face authentication request, transmits the face area or the facial feature information to the authentication device 200, and performs face authentication. In addition, the authentication control unit 140 receives success or failure of the face authentication from the authentication device 200, and replies a face authentication result to a terminal of a request source. Note that, when the face authentication succeeds, the face authentication result includes the user ID. The presentation information DB 150a is a presentation information database that stores a presentation condition and presentation information in association with each other. A large number of presentation conditions are registered in the presentation information DB 150a.

The specification unit 160 acquires, from the history DB 110a, a movement history and an action history associated with the user ID which succeeds in the face authentication or the user ID included in the presentation request. The specification unit 160 determines whether a set of a current position of a user, and the acquired movement history and action history matches the presentation condition registered in the presentation information DB 150a. The current position of a user is an installation position of a terminal which succeeds in face authentication or a current position included in the presentation request. The specification unit 160 compares each presentation condition registered in the presentation information DB 150a with a set of the current position of a user, and the acquired movement history and action history, and specifies all the matching presentation conditions. Then, the specification unit 160 specifies all pieces of the presentation information associated with all the specified presentation conditions by reading the presentation information DB 150a. The output unit 170 transmits the presentation information specified by the specification unit 160 to a terminal which succeeds in face authentication or a terminal which performs the presentation request via the network 500.

The authentication device 200 is a device for performing face authentication of a user. The authentication device 200 includes a facial feature DB 210. The facial feature DB 210 is a facial feature database that stores a user ID and facial feature information of the user in association with each other. Note that, the facial feature DB 210 is one example of a facial feature information storage unit. The face authentication terminal 300 is a terminal for photographing an image used for face authentication. The face authentication terminal 300 is a terminal that transmits a photographed image to the presentation control device 100a and performs a face authentication request. The face authentication terminal 300 is installed at each point in an area A. Specifically, a face authentication terminal 300X is installed at a point X, a face authentication terminal 300Y is installed at a point Y, and a face authentication terminal 300Z is installed at a point Z.

When a user visits each of the points X to Z, the user performs photographing by directing a his/her face toward an installed camera of the face authentication terminal 300X to 300Z, and performs purchasing of a product and the like at the point.

The user terminal 400 is a terminal carried by a user. The user terminal 400 is, for example, a communication terminal such as a smart phone, a tablet, or a PC. A user uses the face authentication terminal 300 or the user terminal 400, and photographs an image including the user's face. The face authentication terminal 300 or the user terminal 400 transmits the photographed image to the presentation control device 100a.

Figure 4:
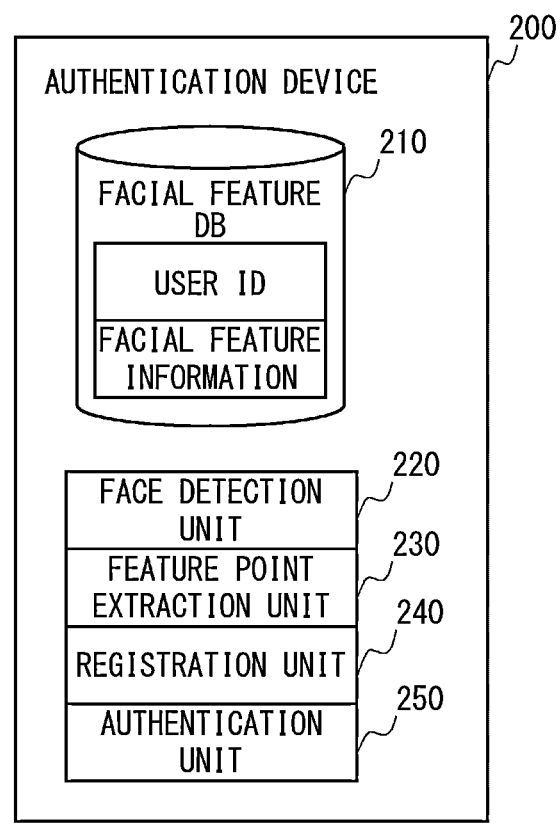
FIG. 4 is a block diagram illustrating a configuration of an authentication device.

Next, a configuration of the authentication device 200 will be described in detail with reference to FIG. 4. FIG. 4 is a block diagram illustrating the configuration of the authentication device 200. The authentication device 200 includes the facial feature DB 210, a face detection unit 220, a feature point extraction unit 230, a registration unit 240, and an authentication unit 250.

The facial feature DB 210 is a facial feature database that stores a user ID and facial feature information of the user in association with each other. The face detection unit 220 detects a face area included in a photographed image, and outputs the detected face area to the feature point extraction unit 230. The feature point extraction unit 230 extracts a feature point from the face area detected by the face detection unit 220, and outputs facial feature information to the registration unit 240. The facial feature information is a set of extracted feature points.

The registration unit 240 newly issues a user ID when registering facial feature information. The registration unit 240 registers, in the facial feature DB 210, the issued user ID and the facial feature information extracted from a registered image in association with each other. The authentication unit 250 collates the facial feature information extracted from a face image with the facial feature information in the facial feature DB 210. When the facial feature information matches, the authentication unit 250 determines that the face authentication has succeeded, and when the facial feature information does not match, the authentication unit 250 determines that the face authentication has failed. The authentication unit 250 replies success or failure of the face authentication to the presentation control device 100a. Presence or absence of matching of the facial feature information corresponds to the success or failure of the authentication. In addition, when the face authentication succeeds, the authentication unit 250 specifies the user ID associated with the successful facial feature information, and replies an authentication result including the specified user ID and a fact that the authentication succeeds to the presentation control device 100a.

Figure 7:
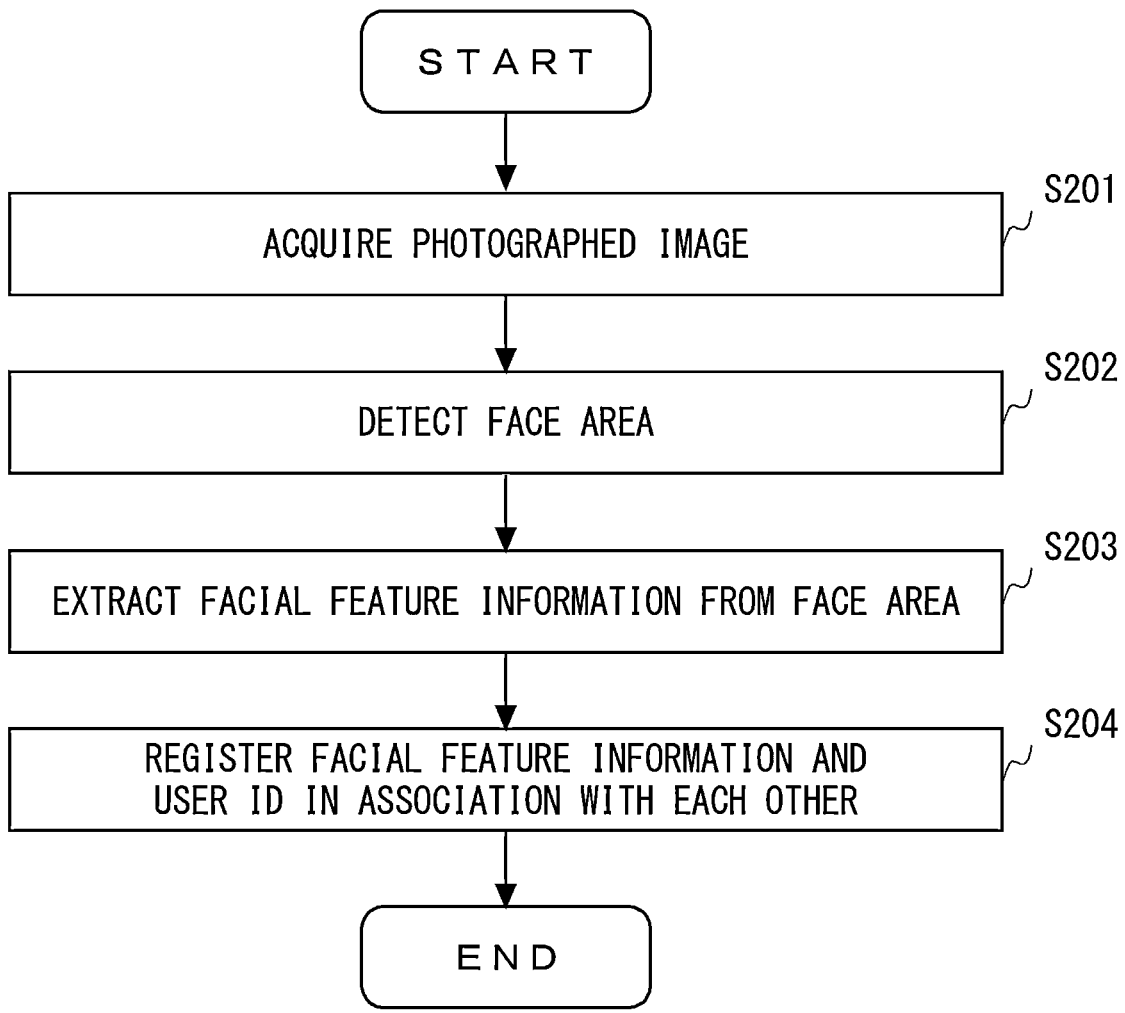
FIG. 7 is a flowchart illustrating a flow of facial feature information registration processing.

Referring to FIG. 7, an operation of the authentication device 200 when registering a user ID and facial feature information in the facial feature DB 210 will be described. FIG. 7 is a flowchart illustrating a flow of facial feature information registration processing. In FIG. 7, a case where the face authentication terminal 300 photographs an image and registers facial feature information is described, but the facial feature information can be registered in a similar procedure even when the user terminal 400 photographs an image.

When registering facial feature information, the face authentication terminal 300 photographs an image including a user's face as a registration image, and issues a facial feature information registration request to the authentication device 200 via the network 500. The facial feature information registration request includes a registration image. First, the authentication device 200 acquires a registration image from the face authentication terminal 300 or the user terminal 400 via the network 500 (step S201).

Next, the face detection unit 220 detects a face area included in the registration image (step S202), and outputs the detected face area to the feature point extraction unit 230. Next, the feature point extraction unit 230 extracts a feature point from the face area, and outputs facial feature information to the registration unit 240 (step S203). Next, the registration unit 240 issues a user ID associated with the output facial feature information, and registers, in the facial feature DB 210, the user ID and the facial feature information in association with each other (step S204).

Figure 8:
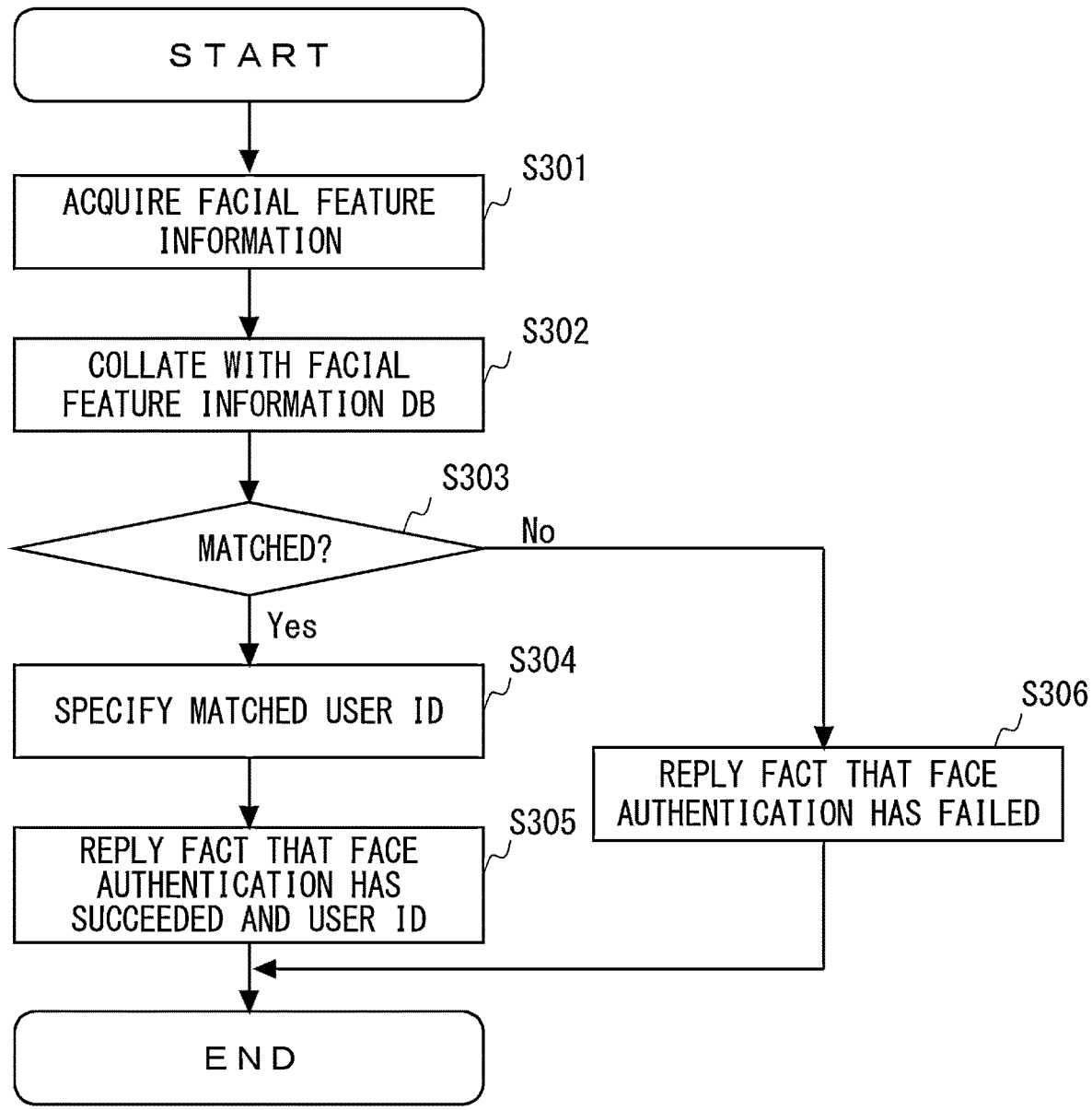
FIG. 8 is a flowchart illustrating a flow of face authentication processing.

Referring to FIG. 8, an operation of the authentication device 200 when performing face authentication will be described. FIG. 8 is a flowchart illustrating a flow of face authentication processing. In FIG. 8, a case where the face authentication terminal 300 requests face authentication is described, but the face authentication can be performed in a similar procedure even when the user terminal 400 requests face authentication.

When performing face authentication, the face authentication terminal 300 photographs an image including a user's face as an authentication image, and performs a face authentication request to the presentation control device 100a via the network 500. The face authentication request includes an authentication image. First, the presentation control device 100a transmits a face area or facial feature information extracted from the authentication image to the authentication device 200. The feature point extraction unit 230 acquires facial feature information by extracting facial feature information from the received face area or receiving facial feature information (step S301).

Next, the authentication unit 250 collates the facial feature information acquired by the acquisition unit 130 with the facial feature DB 210 (step S302). When the facial feature information matches (Yes in step S303), the authentication unit 250 specifies a user ID of a user whose facial feature information matches (step S304), and replies a fact that the face authentication has succeeded and the specified user ID to the presentation control device 100a (step S305). When there is no matching facial feature information (No in step S303), the authentication unit 250 replies a fact that the face authentication has failed to the presentation control device 100a (step S306).

Next, a configuration of the face authentication terminal 300 will be described in detail with reference to FIG. 5. The face authentication terminal 300 includes, as a hardware configuration, a photographing device such as a camera, a display device, and a computer. The face authentication terminal 300 is a device that performs a facial feature information registration request and a face authentication request. The face authentication terminal 300 includes, for example, a terminal that performs payment by face authentication, a terminal that performs entrance control by face authentication, a digital signage that presents information according to face authentication, and the like, but is not limited thereto.

Figure 5:
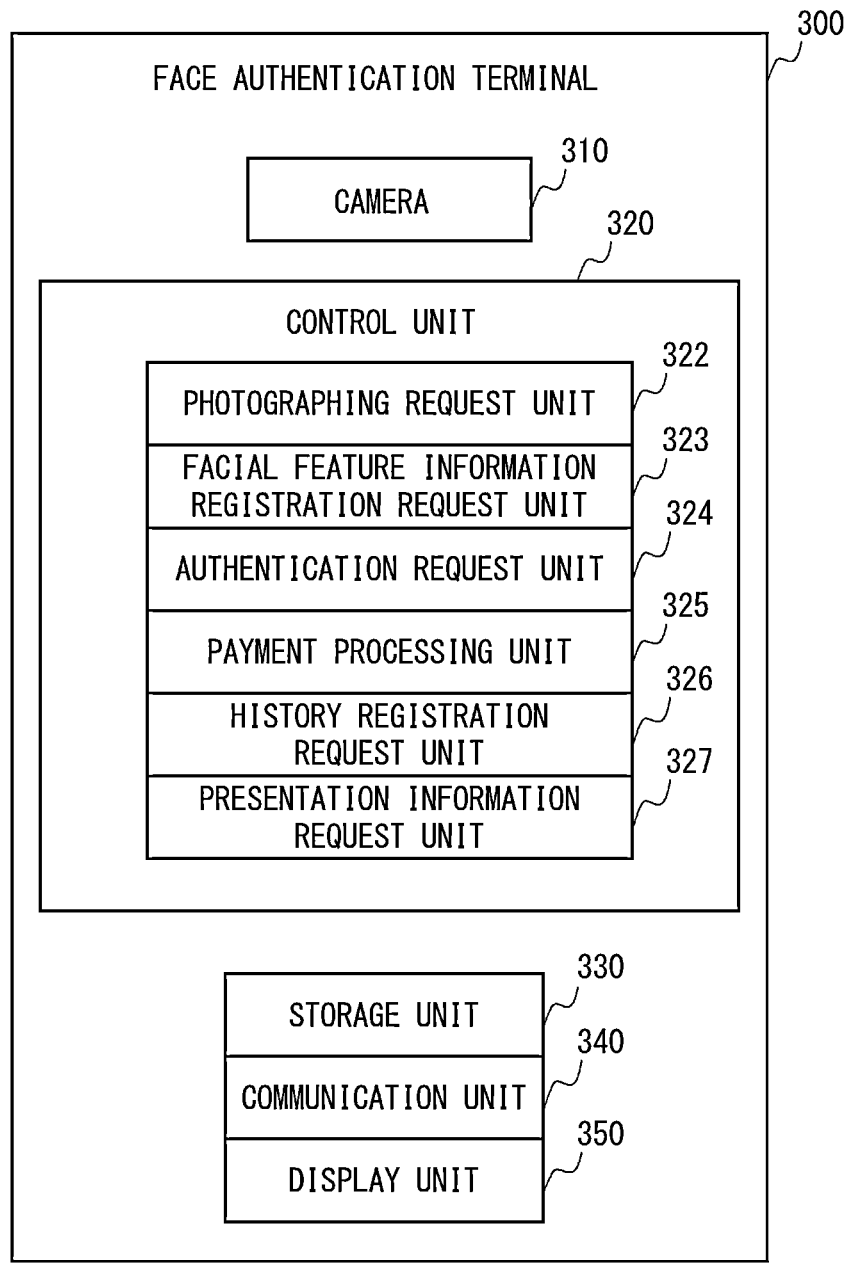
FIG. 5 is a block diagram illustrating a configuration of a face authentication terminal.

FIG. 5 is a block diagram illustrating the configuration of the face authentication terminal 300. The face authentication terminal 300 includes a camera 310, a control unit 320, a storage unit 330, a communication unit 340, and a display unit 350. The camera 310 is a photographing device for photographing an image. The control unit 320 controls hardware included in the face authentication terminal 300. The control unit 320 includes a photographing request unit 322, a facial feature information registration request unit 323, an authentication request unit 324, a payment processing unit 325, a history registration request unit 326, and a presentation information request unit 427.

The photographing request unit 322 requests the camera 310 to photograph. The camera 310 photographs an image including a user's face. An image photographed by the camera 310 is used as a registration image and an authentication image. The facial feature information registration request unit 323 transmits a facial feature information registration request to the authentication device 200 via the network 500. The facial feature information registration request includes a registration image photographed by the camera 310. The authentication request unit 324 transmits a face authentication request to the presentation control device 100a via the network 500. The face authentication request includes an authentication image photographed by the camera 310. The authentication request unit 324 receives success or failure of the face authentication from the presentation control device 100a, and displays the result on the display unit 350.

The payment processing unit 325 executes payment processing when face authentication succeeds. Note that, the control unit 320 may include a not-illustrated recording unit instead of the payment processing unit 325. The recording unit records, when the face authentication succeeds, entrance and exit of a user to and from a facility where the face authentication terminal 300 is installed. The history registration request unit 326 transmits a history registration request to the authentication device 200 via the network 500. Note that, the history registration request includes a payment history as a result of the payment process. The payment history is, for example, information including a payment date and time, an amount of money, an article, a user ID, and the like. The presentation information request unit 327 transmits a presentation information request to the presentation control device 100a via the network 500.

The storage unit 330 is a storage device in which a program for achieving each function of the face authentication terminal 300 is stored. The communication unit 340 is a communication interface with the network 500. The display unit 350 is a display device that displays a face authentication result, presentation information, and the like to a user.

Figure 6:
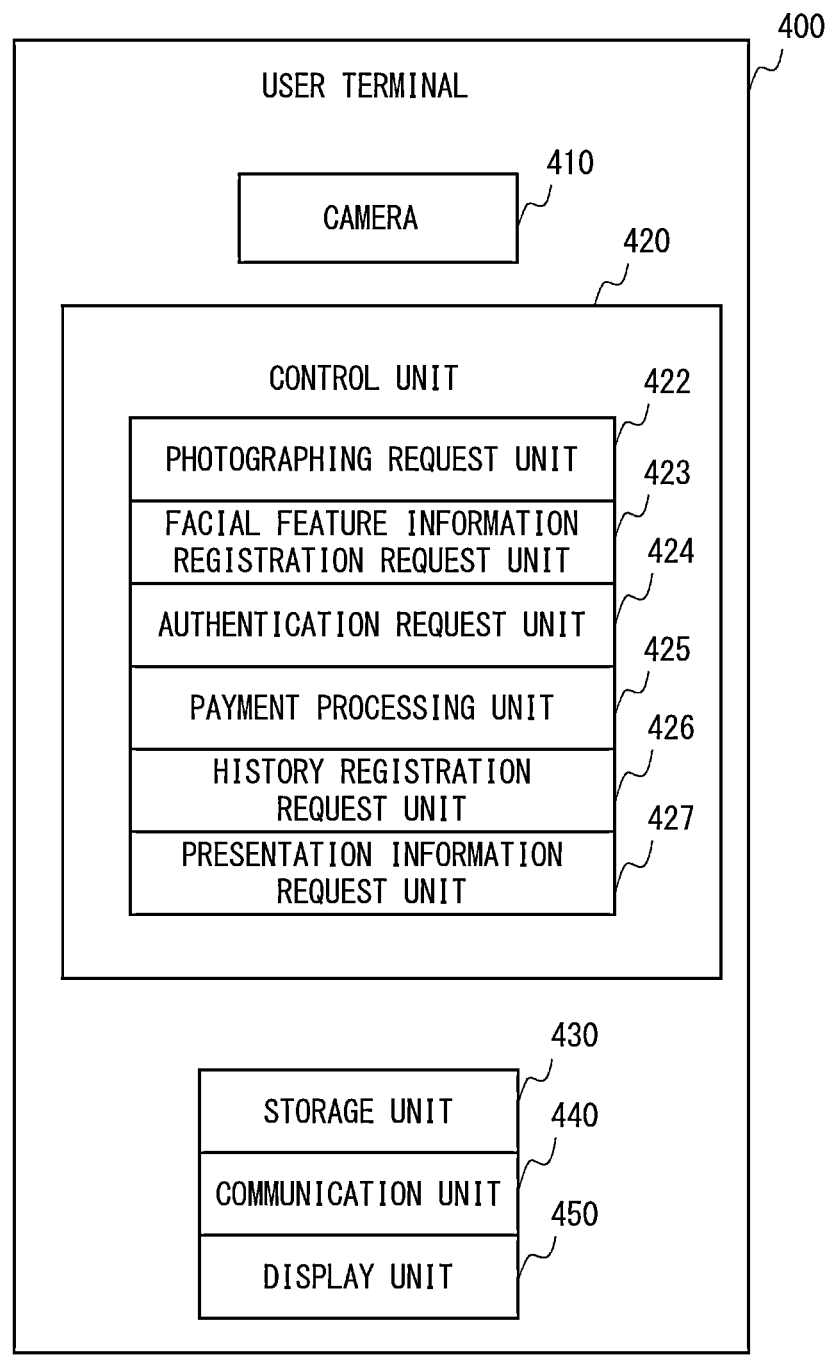
FIG. 6 is a block diagram illustrating a configuration of a user terminal.

Next, a configuration of the user terminal 400 will be described in detail with reference to FIG. 6. FIG. 6 is a block diagram illustrating the configuration of the user terminal 400. The user terminal 400 includes a camera 410, a control unit 420, a storage unit 430, a communication unit 440, and a display unit 450. The control unit 420 includes a photographing request unit 422, a facial feature information registration request unit 423, an authentication request unit 424, a payment processing unit 425, a history registration request unit 426, and a presentation information request unit 427. A function of each configuration included in the user terminal 400 is similar to that of each configuration included in the face authentication terminal 300, and therefore description thereof is omitted.

Figure 9:
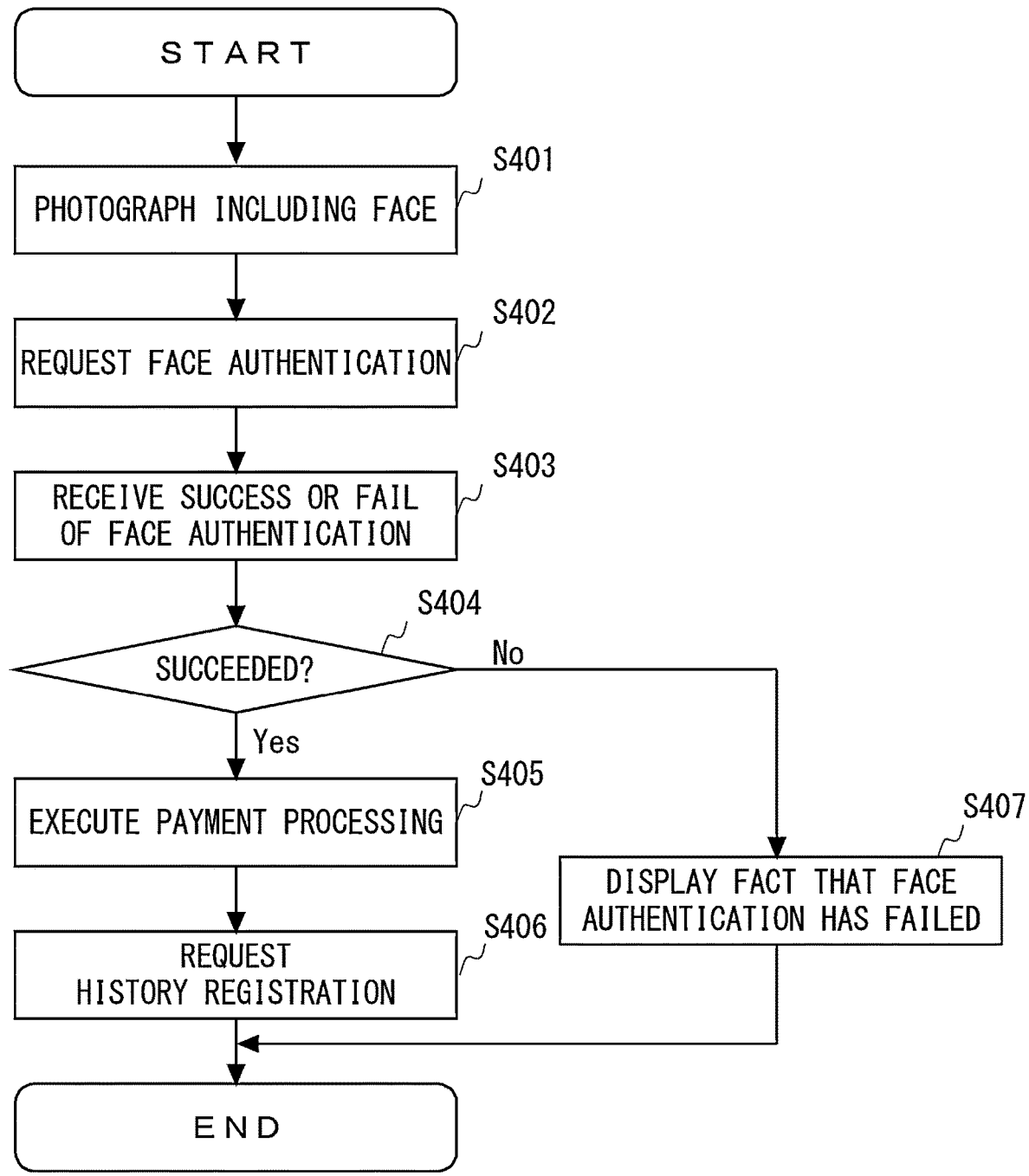
FIG. 9 is a flowchart illustrating a flow of history registration processing.

When face authentication succeeds, the face authentication terminal 300 and the user terminal 400 perform payment processing or the like, and perform a history registration request for registering the history in the presentation control device 100a. Hereinafter, an operation of the face authentication terminal 300 at a time of requesting the history registration will be described with reference to FIG. 9. FIG. 9 is a flowchart illustrating a flow of history registration processing. In FIG. 9, a case where the face authentication terminal 300 requests a history registration will be described, but the user terminal 400 can also perform a history registration request in a similar procedure.

First, the photographing request unit 322 performs a photographing request to the camera 310, and the camera 310 photographs an authentication image including a user's face (step S401). Next, the authentication request unit 324 transmits a face authentication request to the authentication device 200 via the network 500 (step S402), and receives success or failure of the face authentication from the authentication device 200 (step S403). When the face authentication has succeeded (Yes in step S404), the payment processing unit 325 executes the payment processing (step S405), and the history registration request unit 326 performs a history registration request to the authentication device 200 via the network 500 (step S406). When the face authentication has failed (No in step S405), the history registration requesting unit 326 causes the display unit 350 to display a fact that the face authentication has failed.

Figure 10:
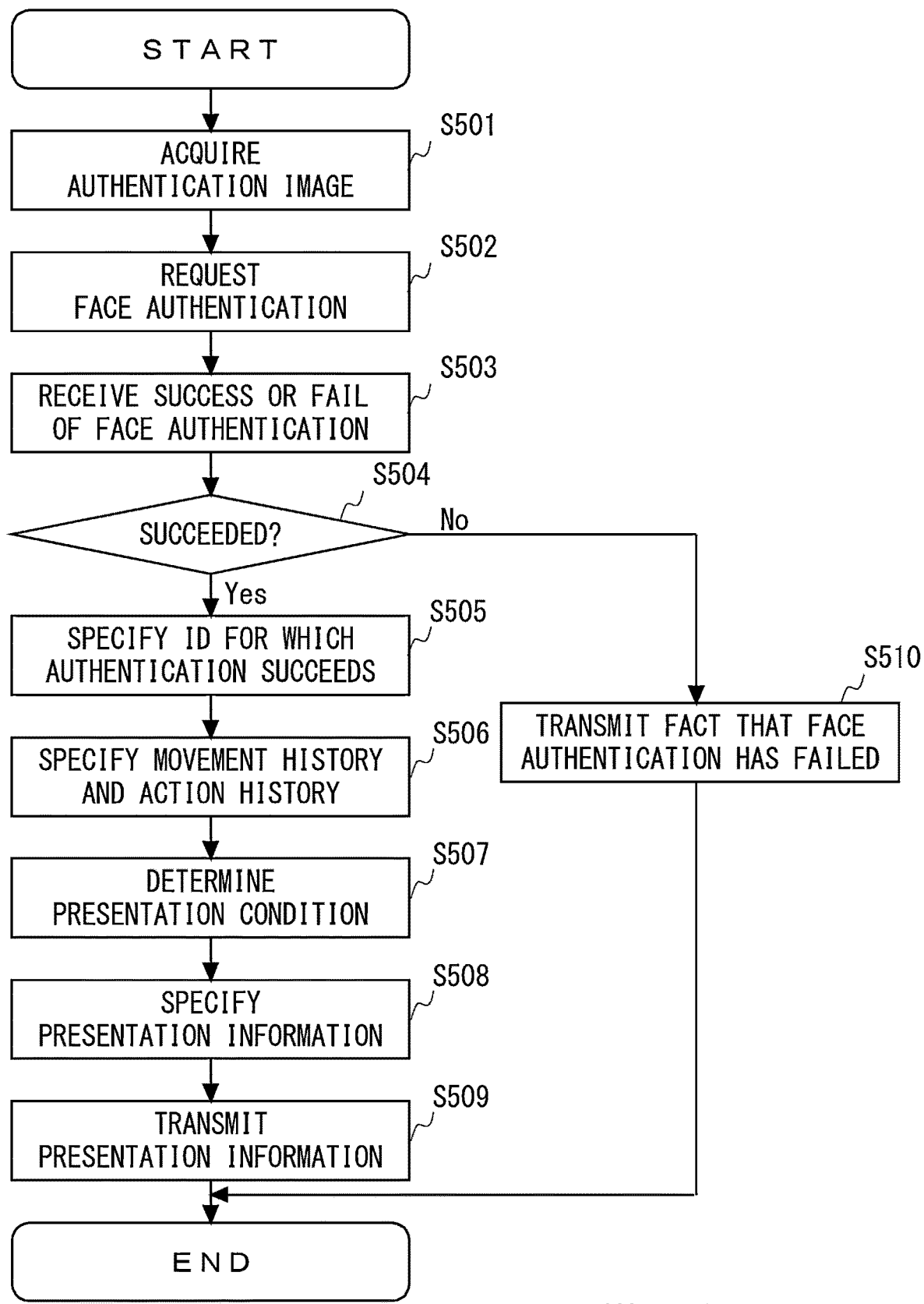
FIG. 10 is a flowchart illustrating a flow of presentation control processing.
Figure 11:
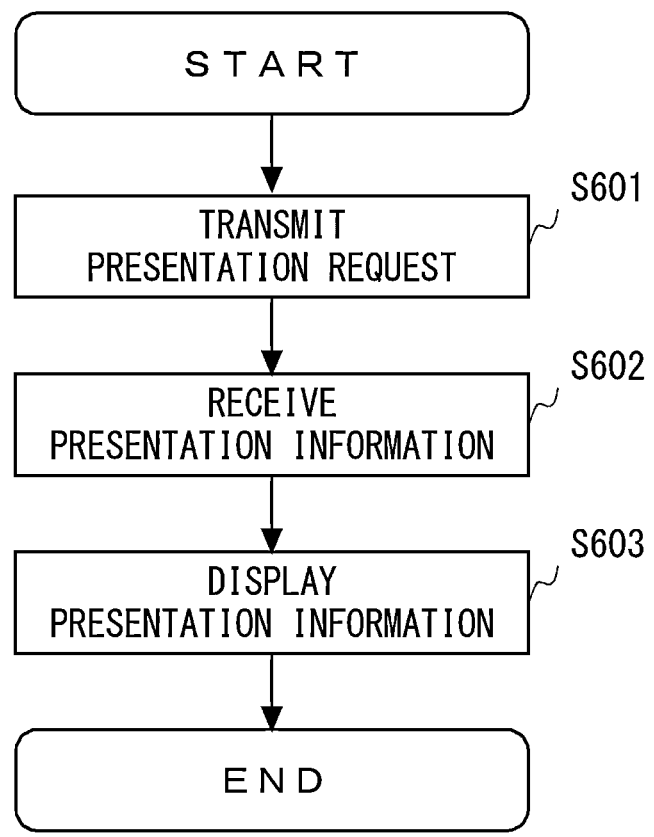
FIG. 11 is a flowchart illustrating a flow of presentation request processing.

The presentation control device 100a presents presentation information when face authentication is successful or when a presentation information request is received. Hereinafter, with reference to FIGS. 10 to 11, an operation of the presentation control device 100a and the like when presenting the presentation information will be described. FIG. 10 is a flowchart illustrating a flow of presentation control processing. FIG. 11 is a flowchart illustrating a flow of presentation processing.

First, with reference to FIG. 10, a case of presenting presentation information when face authentication succeeds will be described. First, the acquisition unit 130 acquires an authentication image photographed by a predetermined image photographing device such as the face authentication terminal 300 and the user terminal 400 (step S501). Note that, at this time, it is assumed that the acquisition unit 130 acquires an installation position of the predetermined photographing device together with the authentication image. Next, the authentication control unit 140 extracts a face area or facial feature information, transmits the face area or the facial feature information to the authentication device 200, and requests face authentication (step S502). Next, the authentication control unit 140 receives success or failure of the face authentication from the authentication device 200 (step S503).

When the face authentication has succeeded (Yes in step S504), the specification unit 160 specifies a user ID which succeeds in the face authentication by extracting the user ID included in the success or failure of the face authentication received in step S503 (step S505). Next, the specification unit 160 acquires, from the history DB 110a, a movement history and an action history associated with the user ID specified in step S605, and thereby specifies the movement history and the action history of the user (step S506).

The specification unit 160 determines whether a set of a current position of a user, and the acquired movement history and action history matches a presentation condition registered in the presentation information DB 150a (step S507). The current position of a user is an installation position of a terminal which succeeds in face authentication or a current position included in the presentation request. A large number of presentation conditions are registered in the presentation information DB 150a. In step S507, the specification unit 160 compares each presentation condition registered in the presentation information DB 150a with a set of the current position of the user, and the acquired movement history and action history, and specifies all the matching presentation conditions. Each presentation condition may include an attribute of a user such as gender, age, and the like. In this case, the specification unit 160 refers to the attribute of a user in addition to the current position of the user, the movement history, and the action history, and specifies a matching presentation condition.

Next, the specification unit 160 specifies presentation information associated with the presentation condition determined to match in step S507 (step S508). Next, the output unit 170 transmits the presentation information specified by the specification unit 160 to a predetermined display terminal such as the face authentication terminal 300 and the user terminal 400 via the network 500 (step S509). When the face authentication has failed (No in step S504), the output unit 170 transmits a fact that the face authentication has failed to a predetermined display terminal via the network 500 (step S510).

Next, a case where the presentation information is presented according to a presentation information request will be described with reference to FIG. 11. When face authentication has succeeded (Yes in step S404), the face authentication terminal 300 and the user terminal 400 can perform presentation processing (steps S601 to 603). The presentation processing (steps S601 to 603) may be performed in parallel with the payment processing (step S405) and the history registration request (step S406), or may be performed after the history registration request (step S406). In FIG. 11, a case where the face authentication terminal 300 performs the presentation processing will be described, but the user terminal 400 can also perform the presentation processing in a similar procedure.

First, the presentation information request unit 327 transmits a presentation information request to the presentation control device 100a via the network 500 (step S601). When receiving the presentation information request, the presentation control device 100a specifies and replies the presentation information by similar procedures as in steps S505 to 509. When the presentation information request unit 327 receives the presentation information from the presentation control device 100a (step S602), the presentation information request unit 327 displays the presentation information on the display unit 350 (step S603).

Figure 12:
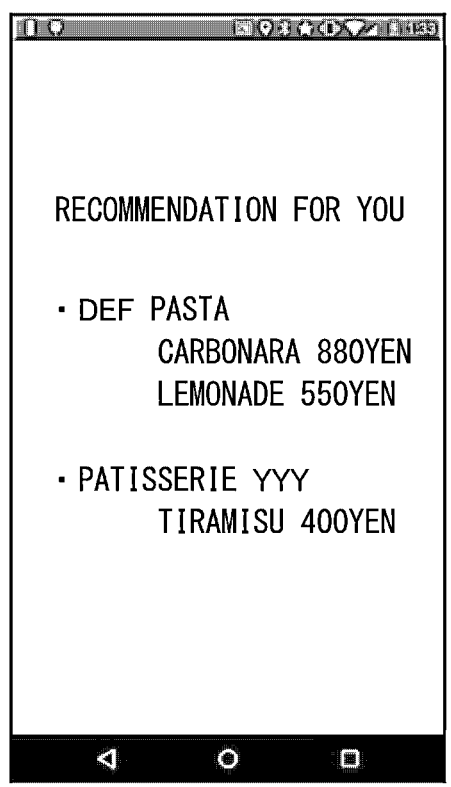
FIG. 12 is a diagram illustrating presentation information displayed on a display terminal.
Figure 13:
FIG. 13 is a diagram illustrating a map displayed on a display terminal.
Figure 14:
FIG. 14 is a diagram illustrating an action history displayed on a display terminal.

FIG. 12 is a diagram illustrating presentation information displayed on a display terminal. FIG. 12 illustrates a case where presentation information is displayed on the user terminal 400. As illustrated in FIG. 12, the user terminal 400 displays the presentation information received in step S509 on a screen. Note that, in step S509, the output unit 170 may transmit a movement history and an action history to the user terminal 400, in addition to the presentation information. FIG. 13 is a diagram illustrating a map displayed on a display terminal as a movement history and an action history. As illustrated in FIG. 13, the user terminal 400 may display the movement history and the action history received in step S509 on the map. In addition, FIG. 14 is a diagram illustrating a movement history and an action history displayed on a display terminal. As illustrated in FIG. 14, the user terminal 400 may display the movement history and the action history received in step S509 in time series.

Hereinafter, a specific example of presentation information associated with a presentation condition will be described. For example, when the presentation condition is "the present position of a user is other than the point Y, the movement history does not include the point Y, and the action history includes purchase of a product", the presentation information is set as "presentation of an admission ticket of the point Y (facility)". The presentation information may be "presentation of a discount coupon at the point Y (facility)" or the like. A user UA illustrated in FIG. 3 is at the point Z (on a road) as the current position. Therefore, when the user UA is eating and drinking at the point X (coffee shop) and there is no history of going to the point Y (facility), the above presentation condition is satisfied. By presenting the admission ticket at the point Y to the user UA, the user UA can be guided to the point Y that has not yet been visited. In addition, when only a user who has a purchase history satisfies the presentation condition, profit of the entire area A can be increased.

Further, for example, when the presentation condition is "the present position of a user is other than the point X, the movement history includes the point Y, and the action history includes entry to the point Y (facility)", the presentation information is set as a "discount coupon at the point X (coffee shop)". A user UB illustrated in FIG. 3 is at the point Y as the current position. Therefore, when the user UB enters the point Y (facility) and has no history of going to the point X, the above presentation condition is satisfied. Generally, it is highly likely that a user immediately after touring a facility desires to have a tea, and it is highly likely that the user will visit a coffee shop or the like. Therefore, by presenting the discount coupon at the point X (coffee shop) to the user UB, a utilization rate of the presented discount coupon can be increased.

Figure 15:
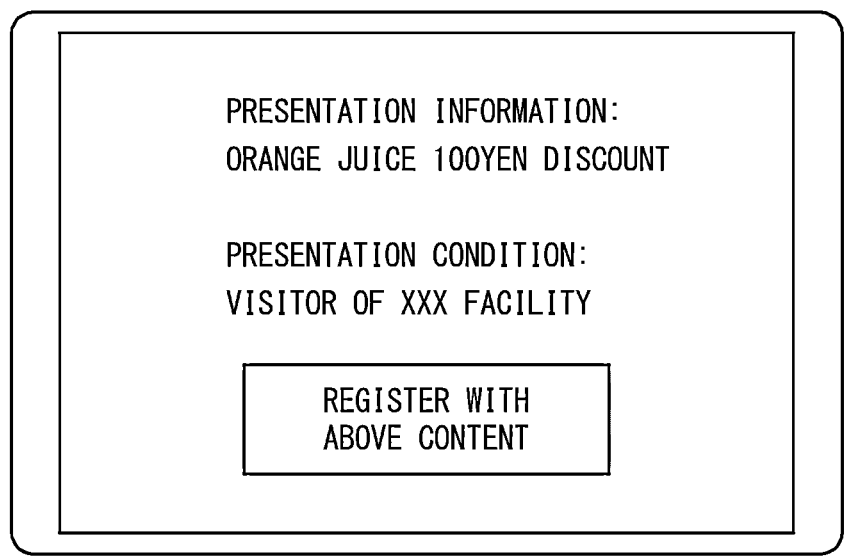
FIG. 15 is a diagram illustrating a registration screen.

Presentation information associated with a presentation condition may be determined by an owner, a store manager, or the like of a store or the like at each point, or may be determined by an administrator or the like. FIG. 15 is a diagram illustrating a registration screen. FIG. 15 illustrates an example in which an owner registers a presentation condition and presentation information from a registration terminal installed in a store or the like. The registration terminal may be any terminal communicable with the presentation control device 100a via the network 500, or may be integrated with the face authentication terminal 300.

Registration of presentation information by an owner of a store or the like may be performed in advance. For example, an owner may register a discount coupon being displayed only during a particular time period or weather. In this case, an owner of a store or the like sets the presentation condition including a specific time period, weather, and the like, and presentation information associated with the presentation condition. Specifically, registration may be conceivable such that an owner of a coffee shop sets a discount coupon for a cake to be displayed only in the evening, and an owner of a facility sets a coupon to be displayed only on a rainy day. In addition, registration of presentation information by an owner of a store or the like may be performed at any time. For example, an owner may view a customer's visit on the day, and set a coupon valid only on that day. In this manner, it is possible to attract customers by presenting a coupon that can be used when the customer is considered to fall.

Registration of presentation information by an administrator or the like is registered using, for example, machine learning. In this case, for example, a movement history and an action history of a user are input to a machine learning model, and an output calculation result is used as presentation information.

Third Example Embodiment

A third example embodiment is a modification example of the second example embodiment described above. When a plurality of presentation conditions are picked up, the presentation control device 100a according to the second example embodiment presents all pieces of associated presentation information. On the other hand, in the third example embodiment, the associated presentation information is displayed with priority.

Figure 16:
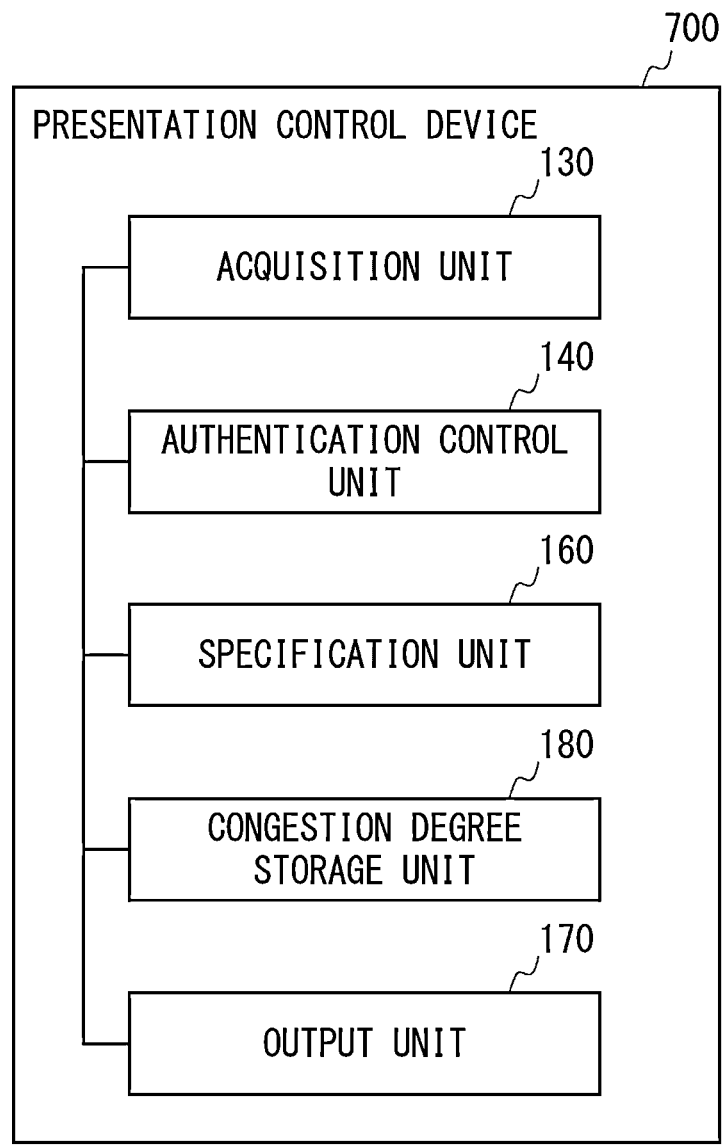
FIG. 16 is a block diagram illustrating a configuration of a presentation control device according to a third example embodiment.

FIG. 16 is a block diagram illustrating a configuration of a presentation control device according to the third example embodiment. A presentation control device 700 includes a congestion degree storage unit 180 in addition to the configuration of the presentation control device 100a illustrated in FIG. 3. Descriptions of each configuration included in the presentation control device 700 that overlap with those of the second example embodiment are omitted as appropriate.

The congestion degree storage unit 180 stores a degree of congestion at each point. The degree of congestion at each point is, for example, registered by an owner of each point in the congestion degree storage unit 180 from a registration terminal or the like via a network 500. In the present example embodiment, when there are a plurality of points satisfying a presentation condition stored in a presentation information DB 150a, a specification unit 160 specifies presentation information relating to a point having a lower degree of congestion. An output unit 170 transmits only the presentation information relating to the point having a lower degree of congestion to a predetermined display terminal such as a face authentication terminal 300 and a user terminal 400 via the network 500. In addition, the output unit 170 may transmit all pieces of the presentation information specified by the specification unit 160 in such a way that the presentation information relating to a point having a lower degree of congestion can be displayed with priority.

Figure 17:
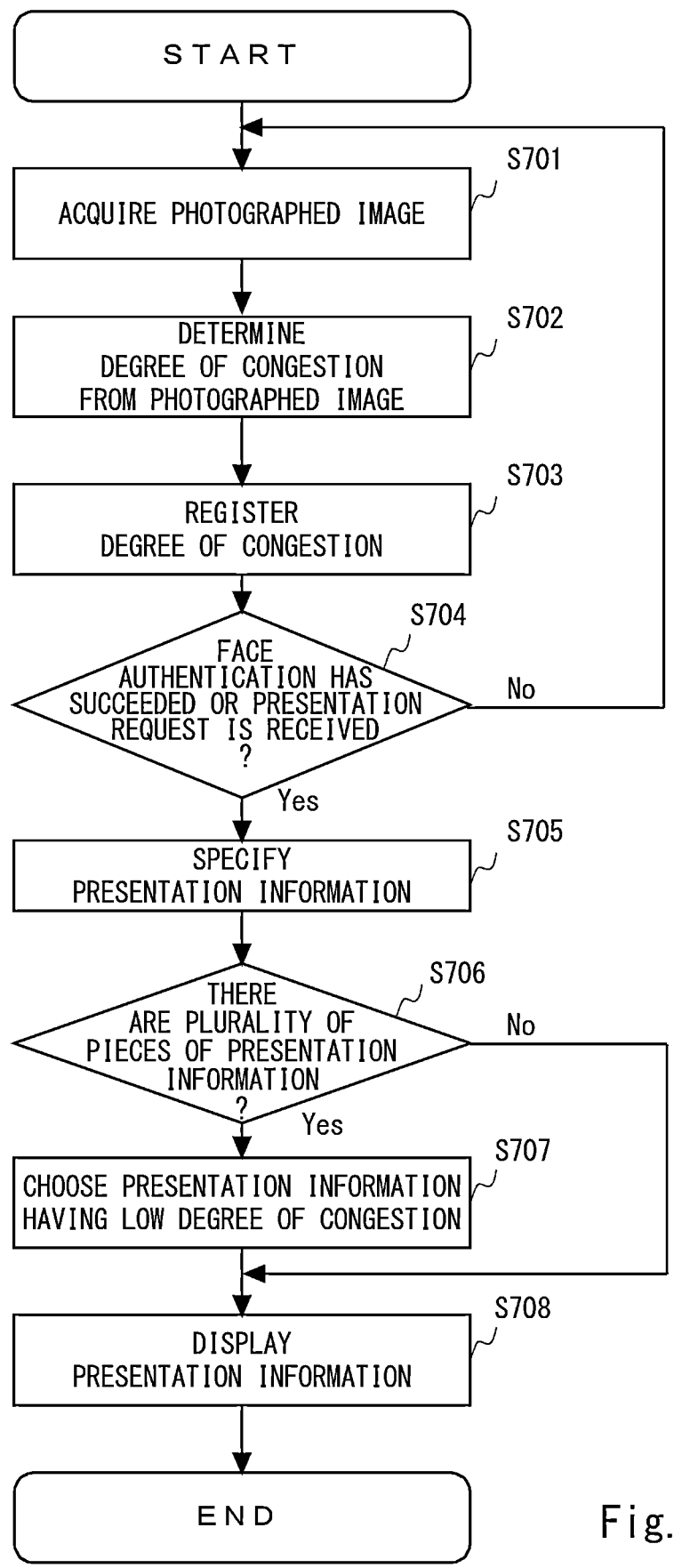
FIG. 17 is a flowchart illustrating a flow of a presentation control method according to the third example embodiment.

The presentation control device 700 may further include a not-illustrated analysis unit. The analysis unit analyzes a photographed image acquired by an acquisition unit 130, determines a degree of congestion at a photographing point, and registers the determined degree of congestion in the congestion degree storage unit 180. With reference to FIG. 17, an operation of the presentation control device 700 in a case where the analysis unit analyzes a photographed image and determines a degree of congestion will be described. FIG. 17 is a flowchart illustrating a flow of a presentation control method according to the third example embodiment.

The acquisition unit 130 acquires a photographed image from the face authentication terminal 300 at each point (step S701). Next, the analysis unit analyzes the photographed image acquired by the acquisition unit 130, determines a degree of congestion at each point (step S702), and registers the determined degree of congestion in the congestion degree storage unit 180 (step S703). Steps S701 to 703 are performed periodically. Therefore, the degree of congestion at each point registered in the congestion degree storage unit 180 is periodically updated. When face authentication has not succeeded and a presentation information request has not been received (No in step S704), steps S701 to 703 are periodically performed. When the face authentication succeeds or a presentation information request is received (Yes in step S704), the specification unit 160 specifies a presentation condition and associated presentation information (step S705).

When a plurality of pieces of presentation information are specified in step S705 (Yes in step S706), the specification unit 160 specifies presentation information for guiding a user to a point having a lower degree of congestion (step S708). Next, the output unit 170 transmits the presentation information specified in step S708 to a predetermined display device, and the predetermined display device displays the presentation information (step S709). When the number of pieces of presentation information specified in step S705 is one (No in step S706), the output unit 170 transmits the presentation information specified in step S705 to a predetermined display device, and the predetermined display device displays the presentation information (step S709).

Since the presentation control device according to the present example embodiment can preferentially present presentation information at a point having a low degree of congestion, the degree of congestion between points can be equalized. Furthermore, the presentation control device according to the present example embodiment can achieve similar effects with those described in the first and second example embodiments.

Fourth Example Embodiment

A fourth example embodiment is a modification example of the first to third example embodiments described above. The presentation control devices 100, 100a, and 700 according to the first to third example embodiments perform face authentication using an external authentication device 200. On the other hand, a presentation control device 800 according to the present example embodiment performs face authentication inside the device.

Figure 18:
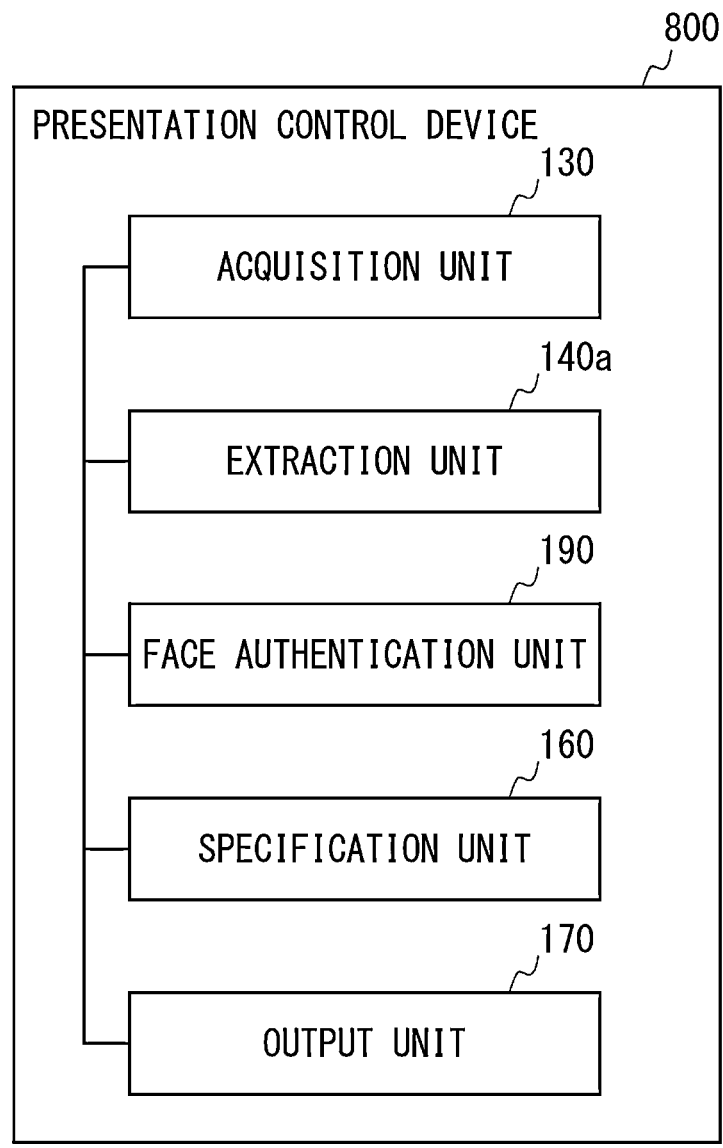
FIG. 18 is a block diagram illustrating a configuration of a presentation control device according to a fourth example embodiment.
Figure 19:
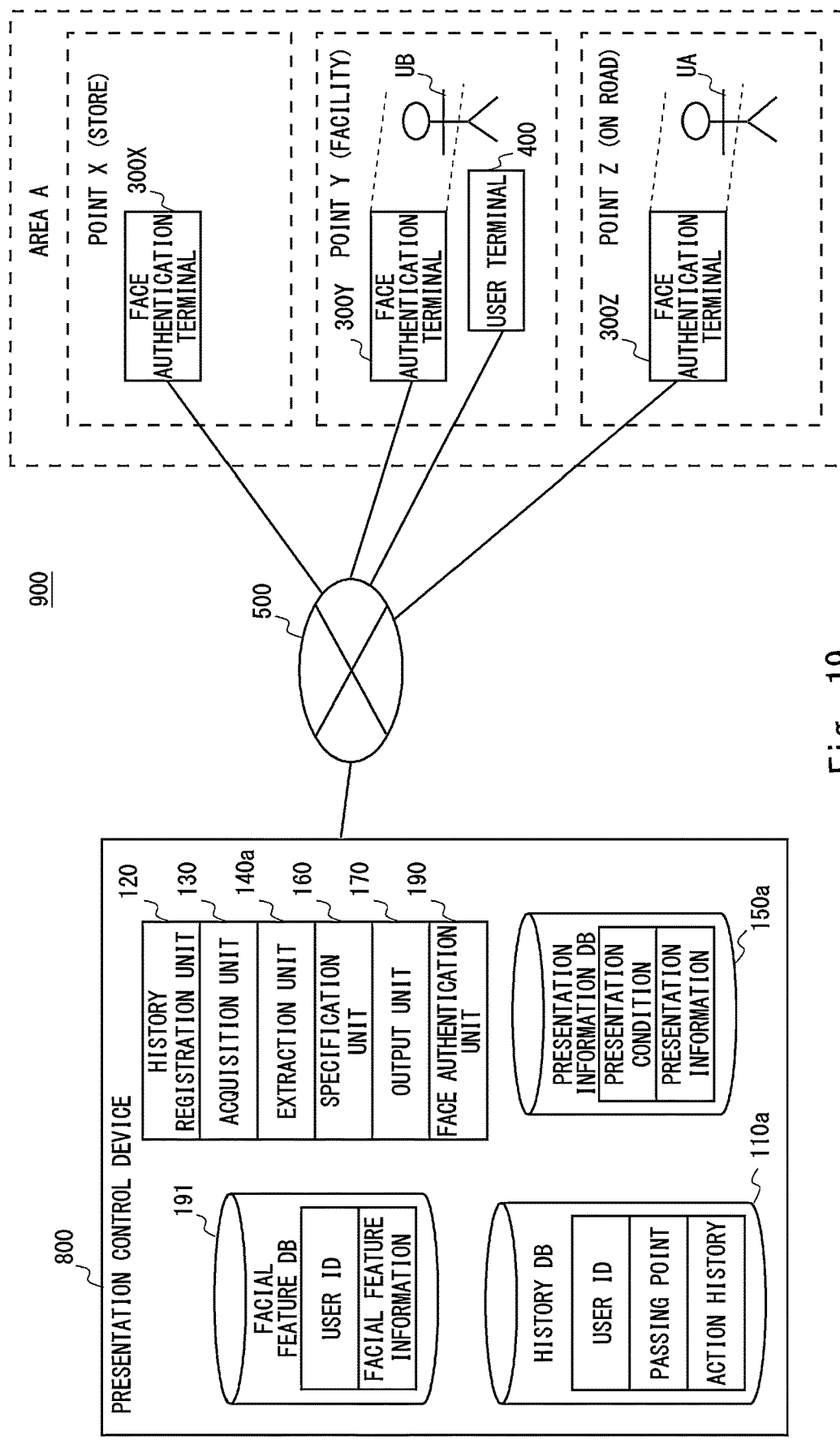
FIG. 19 is a block diagram illustrating a configuration of a presentation control system according to the fourth example embodiment.

FIG. 18 is a block diagram illustrating a configuration of a presentation control device according to the fourth example embodiment. In the presentation control device 800, as compared with the configuration of the presentation control device 100 illustrated in FIG. 1, an authentication control unit 140 replaces an extraction unit 140a and a face authentication unit 190, and a facial feature DB 191 is added. Note that, the facial feature DB 191 is one example of a facial feature information storage unit. Descriptions of each configuration included in the presentation control device 800 that overlap with those of the second example embodiment will be omitted as appropriate. FIG. 19 is a block diagram illustrating a configuration of a presentation control system according to the fourth example embodiment. A presentation control system 900 differs from the presentation control system 600 in that an authentication device 200 is not provided and the presentation control device 800 is provided. Since other configurations are similar, the description thereof is omitted as appropriate.

The extraction unit 140a extracts a face area or facial feature information from a photographed image. The face authentication unit 190 performs face authentication, based on the extracted face area or facial feature information. The facial feature DB 191 is a facial feature database that stores a user ID and facial feature information of the user in association with each other. The presentation control device 800 controls presentation of presentation information in a flow illustrated in FIG. 2 similarly to the presentation control device 100. However, in step S103, the extraction unit 140a extracts a face area or facial feature information from the photographed image acquired by an acquisition unit 130, and the face authentication unit 190 performs face authentication, based on the extracted face area or facial feature information. Furthermore, the presentation control device according to the present example embodiment can achieve similar effects with those described in the first to third example embodiments.

Note that, in the above example embodiments, a hardware configuration has been described, but the present invention is not limited thereto. The present disclosure can also be achieved any processing by causing a CPU to execute a computer program.

In the above examples, a program may be stored using various types of non-transitory computer-readable media, and supplied to a computer. The non-transitory computer-readable medium includes various types of tangible storage media. Examples of non-transitory computer-readable medium include a magnetic recording medium (e.g., a flexible disk, a magnetic tape, and a hard disk drive), a magneto-optical recording medium (e.g., a magneto-optical disk), a CD-read only memory (CD-ROM), a CD-R, a CD-R/W, a digital versatile disc (DVD), and a semiconductor memory (e.g., a mask ROM, a programmable ROM (PROM), an erasable PROM (EPROM), a flash ROM, a random access memory (RAM)). In addition, a program may also be supplied to a computer by various types of transitory computer-readable media. Examples of transitory computer-readable medium include an electric signal, an optical signal, and an electromagnetic wave. The transitory computer-readable medium may supply a program to a computer via a wired communication path such as an electric wire and an optical fiber, or a wireless communication path.

Note that, the present disclosure is not limited to the above-mentioned example embodiments, and can be appropriately changed within a range not deviating from the gist. The present disclosure may be implemented by appropriately combining each of the example embodiments.

Some or all of the above example embodiments may also be described as the following supplementary notes, but are not limited to the following.

(Supplementary Note A1)

A presentation control device including:
  an acquisition unit configured to acquire a photographed image photographed by a predetermined photographing device;
  an authentication control unit configured to extract a face area or facial feature information from the photographed image and cause an authentication device to perform face authentication;
  a specification unit configured to specify presentation information to be presented for guiding to a predetermined point, based on a movement history and an action history being associated with a user ID of a user who succeeds in the face authentication; and
  an output unit configured to transmit the presentation information specified by the specification unit to a predetermined display terminal.

(Supplementary Note A2)

The presentation control device according to Supplementary Note A1, further including:
  a history storage unit configured to store a movement history and an action history of a user;
  a history registration unit configured to register, in the history storage unit, a user ID, and a movement history and an action history in association with one another; and
  a presentation information storage unit configured to store presentation information to be presented for guiding a user to a point different from a current point, and a presentation condition based on the movement history and the action history in association with each other,
  wherein the specification unit acquires, from the history storage unit, a movement history and an action history being associated with a user ID of a user who succeeds in the face authentication, and specifies presentation information in which the movement history and the action history satisfy a presentation condition stored in the presentation information storage unit.

(Supplementary Note A3)

The presentation control device according to Supplementary Note A2, wherein the presentation condition further includes a current position of the user, the acquisition unit further acquires position information of the photographing device, and the specification unit specifies presentation information satisfying the presentation condition by setting the acquired position information as a current position of a user who succeeds in the face authentication.

(Supplementary Note A4)

The presentation control device according to Supplementary Note A2 or A3, further including a congestion degree storage unit configured to store a degree of congestion at each point, wherein the specification unit specifies presentation information relating to a point having a lower degree of congestion when there are a plurality of points satisfying a presentation condition in the presentation information storage unit.

(Supplementary Note A5)

The presentation control device according to Supplementary Note A4, further including an analysis unit configured to analyze the photographed image acquired by the acquisition unit, determine a degree of congestion at a photographing point, and register the determined degree of congestion in the congestion degree storage unit.

(Supplementary Note A6)

The presentation control device according to any one of Supplementary Notes A3 to A5, wherein the presentation information storage unit stores a presentation condition based on a time period.

(Supplementary Note A7)

The presentation control device according to any one of Supplementary Notes A3 to A6, wherein the presentation information storage unit stores a presentation condition based on weather.

(Supplementary Note A8)

The presentation control device according to any one of Supplementary Notes A1 to A7, wherein the movement history further includes information on a time at which a user passed through each point.

(Supplementary Note A9)

The presentation control device according to any one of Supplementary Notes A1 to A8, wherein the action history further includes information on a time at which a user acts.

(Supplementary Note B1)

A presentation control system including:

a predetermined photographing device configured to photograph an image including a face area of a user;

a presentation control device configured to be communicable with the predetermined photographing device; and an authentication device configured to store facial feature information of the user and be communicable with the presentation control device, wherein the presentation control device includes an acquisition unit configured to acquire a photographed image photographed by the predetermined photographing device, an authentication control unit configured to extract a face area or facial feature information from the photographed image and cause the authentication device to perform face authentication, a specification unit configured to specify presentation information to be presented for guiding to a predetermined point, based on a movement history and an action history being associated with a user ID of a user who succeeds in the face authentication, and an output unit configured to transmit the presentation information specified by the specification unit to a predetermined display terminal.

(Supplementary Note B2)

The presentation control system according to Supplementary Note B1, wherein the presentation control device further includes a history storage unit configured to store a movement history and an action history of a user, a history registration unit configured to register, in the history storage unit, a user ID, and a movement history and an action history in association with one another, and a presentation information storage unit configured to store presentation information to be presented for guiding a user to a point different from a current point, and a presentation condition based on the movement history and the action history in association with each other, and the specification unit acquires, from the history storage unit, a movement history and an action history being associated with a user ID of a user who succeeds in face authentication, and specifies presentation information in which the movement history and the action history satisfy a presentation condition stored in the presentation information storage unit.

(Supplementary Note C1)

A presentation control method including, by a computer:

a step of acquiring a photographed image photographed by a predetermined photographing device;

a step of extracting a face area or facial feature information from the photographed image and causing an authentication device to perform face authentication;

a step of specifying presentation information to be presented for guiding to a predetermined point, based on a movement history and an action history of a user who succeeds in the face authentication; and a step of transmitting the specified presentation information to a predetermined display device.

(Supplementary Note D1)

A non-transitory computer-readable medium storing a presentation control program causing a computer to execute:

a step of acquiring a photographed image photographed by a predetermined photographing device;

a step of extracting a face area or facial feature information from the photographed image and causing an authentication device to perform face authentication;

a step of specifying presentation information to be presented for guiding to a predetermined point, based on a movement history and an action history of a user who succeeds in the face authentication; and a step of transmitting the specified presentation information to a predetermined display device.

(Supplementary Note E1)

A presentation control device including:

an acquisition unit configured to acquire a photographed image photographed by a predetermined imaging device;

an extraction unit configured to extract a face area or facial feature information from the photographed image;

a face authentication unit configured to perform face authentication, based on the face area or the facial feature information;

a specification unit configured to specify presentation information to be presented for guiding to a predetermined point, based on a movement history and an action history being associated with a user ID of a user who succeeds in the face authentication; and an output unit configured to transmit the presentation information specified by the specification unit to a predetermined display terminal.

(Supplementary Note E2)

The presentation control device according to Supplementary Note E1, further including:

a history storage unit configured to store a movement history and an action history of a user;

a history registration unit configured to register, in the history storage unit, a user ID, and a movement history and an action history in association with one another; and a presentation information storage unit configured to store presentation information to be presented for guiding a user to a point different from a current point, and a presentation condition based on the movement history and the action history in association with each other, wherein the specification unit acquires, from the history storage unit, a movement history and an action history being associated with a user ID of a user who succeeds in the face authentication, and specifies presentation information in which the movement history and the action history satisfy a presentation condition stored in the presentation information storage unit.

(Supplementary Note F1)

A presentation control method including, by a computer:

a step of acquiring a photographed image photographed by a predetermined photographing device;

a step of extracting a face area or facial feature information from the photographed image;

a step of performing face authentication, based on the face area or the facial feature information;

a step of specifying presentation information to be presented for guiding to a predetermined point, based on a movement history and an action history of a user who succeeds in the face authentication; and a step of transmitting the specified presentation information to a predetermined display device.

(Supplementary Note G1)

A non-transitory computer-readable medium storing a presentation control program causing a computer to execute:

a step of acquiring a photographed image photographed by a predetermined photographing device;

a step of extracting a face area or facial feature information from the photographed image;

a step of performing face authentication, based on the face area or the facial feature information;

a step of specifying presentation information to be presented for guiding to a predetermined point, based on a movement history and an action history of a user who succeeds in the face authentication; and a step of transmitting the specified presentation information to a predetermined display device.

Although the invention of the present application has been described above with reference to the example embodiments (and examples), the invention of the present application is not limited to the above example embodiments (and examples). Various changes that can be understood by those skilled in the art within the scope of the invention of the present application can be made to the configurations and details of the invention of the present application.

REFERENCE SIGNS LIST 100, 100a, 700, 800 PRESENTATION CONTROL DEVICE
600, 900 PRESENTATION CONTROL SYSTEM
110a HISTORY DB
120 HISTORY REGISTRATION UNIT
130 ACQUISITION UNIT
140 AUTHENTICATION CONTROL UNIT
140a EXTRACTION UNIT
150a PRESENTATION INFORMATION DB
160 SPECIFICATION UNIT
170 OUTPUT UNIT
180 CONGESTION DEGREE STORAGE UNIT
190 FACE AUTHENTICATION UNIT
191 FACIAL FEATURE DB
200 AUTHENTICATION DEVICE
210 FACIAL FEATURE DB
220 FACE DETECTION UNIT
230 FEATURE POINT EXTRACTION UNIT
240 REGISTRATION UNIT
250 AUTHENTICATION UNIT
300 (300X to 300Z) FACE AUTHENTICATION TERMINAL
310 CAMERA
320 CONTROL UNIT
322 PHOTOGRAPHING REQUEST UNIT
323 FACIAL FEATURE INFORMATION REGISTRATION REQUEST UNIT
324 AUTHENTICATION REQUEST UNIT
325 PAYMENT PROCESSING UNIT
326 HISTORY REGISTRATION REQUEST UNIT
327 PRESENTATION INFORMATION REQUEST UNIT
330 STORAGE UNIT
340 COMMUNICATION UNIT
350 DISPLAY UNIT
400 USER TERMINAL
410 CAMERA
420 CONTROL UNIT
422 PHOTOGRAPHING REQUEST UNIT
423 FACIAL FEATURE INFORMATION REGISTRATION REQUEST UNIT
424 AUTHENTICATION REQUEST UNIT
425 PAYMENT PROCESSING UNIT
426 HISTORY REGISTRATION REQUEST UNIT
427 PRESENTATION INFORMATION REQUEST UNIT
430 STORAGE UNIT
440 COMMUNICATION UNIT
450 DISPLAY UNIT
500 NETWORK

What is claimed is:

1. A presentation control device comprising:
at least one memory storing:
  instructions;
  a movement history and an action history of a user;
  presentation information to be presented for guiding a user to a point different from a current point; and
  a presentation condition based on the movement history and the action history in association with each other; and
at least one processor configured to execute the instructions to:

acquire a photographed image photographed by a predetermined photographing device;
extract a face area or facial feature information from the photographed image and causing an authentication device to perform face authentication;
register, in the at least one memory, a user ID, the movement history, and the action history in association with one another;
acquire, from the at least one memory, the movement history and the action history associated with the user ID of the user who succeeds in the face authentication, and the presentation information to be presented for guiding the user to a predetermined point in which the movement history and the action history satisfy the presentation condition stored in the at least one memory; and
transmit the presentation information to a predetermined display terminal.

2. The presentation control device according to claim 1, wherein
the presentation condition further includes the current position of the user, and
the at least one processor is further configured to execute the instructions to:
acquire position information of the photographing device, and
specify the presentation information satisfying the presentation condition by setting the acquired position information as the current position of the user who succeeds in the face authentication.

3. The presentation control device according to claim 1, wherein the at least one memory is configured to store a degree of congestion at each point, and
the at least one processor is further configured to execute the instructions to:
specify the presentation information relating to a point having a lower degree of congestion when there are a plurality of points satisfying the presentation condition stored in the at least one memory.

4. The presentation control device according to claim 3, wherein the at least one processor is further configured to execute the instructions to:
analyze the photographed image;
determine a degree of congestion at a photographing point; and
register the determined degree of congestion in the at least one memory.

5. The presentation control device according to claim 2, wherein the at least one memory stores the presentation condition based on a time period.

6. The presentation control device according to claim 2, wherein the at least one memory stores the presentation condition based on weather.

7. The presentation control device according to claim 1, wherein the movement history further includes information on a time at which the user passes through each point.

8. The presentation control device according to claim 1, wherein the action history further includes information on a time at which the user acts.

9. A presentation control method performed by a computer and comprising:
storing, in at least one memory:
a movement history and an action history of a user;
presentation information to be presented for guiding a user to a point different from a current point; and
a presentation condition based on the movement history and the action history in association with each other; and
acquiring a photographed image photographed by a predetermined photographing device;
extracting a face area or facial feature information from the photographed image and causing an authentication device to perform face authentication;
registering, in the at least one memory, a user ID, the movement history, and the action history in association with one another;
acquiring, from the at least one memory, the movement history and the action history associated with the user ID of the user who succeeds in the face authentication, and the presentation information to be presented for guiding the user to a predetermined point in which the movement history and the action history satisfy the presentation condition stored in the at least one memory; and
transmitting the presentation information to a predetermined display terminal.

10. A non-transitory computer-readable medium storing a presentation control program executable by a computer to perform processing comprising:
storing, in at least one memory:
a movement history and an action history of a user;
presentation information to be presented for guiding a user to a point different from a current point; and
a presentation condition based on the movement history and the action history in association with each other; and
acquiring a photographed image photographed by a predetermined photographing device;
extracting a face area or facial feature information from the photographed image and causing an authentication device to perform face authentication;
registering, in the at least one memory, a user ID, the movement history, and the action history in association with one another;
acquiring, from the at least one memory, the movement history and the action history associated with the user ID of the user who succeeds in the face authentication, and the presentation information to be presented for guiding the user to a predetermined point in which the movement history and the action history satisfy the presentation condition stored in the at least one memory; and
transmitting the presentation information to a predetermined display terminal,
a step of acquiring a photographed image photographed by a predetermined photographing device;
a step of extracting a face area or facial feature information from the photographed image and causing an authentication device to perform face authentication.

* * * * *